United States Patent Office 3,250,762
Patented May 10, 1966

3,250,762
WATER-INSOLUBLE MONOAZO-DYESTUFFS
Helmut Gies, Hofheim, Taunus, and Helmut Lindner and Arthur Siebert, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 11, 1963, Ser. No. 286,922
Claims priority, application Germany, June 22, 1962, F 37,130
5 Claims. (Cl. 260—207)

The present invention relates to water-insoluble monoazo-dyestuffs and to a process for preparing them; more particularly it relates to water-insoluble monoazo-dyestuffs of the general formula

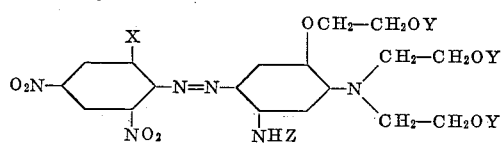

in which X represents a hydrogen, chlorine or bromine atom, Y represents a hydrogen atom or an acyl radical of low molecular weight, and Z represents an acyl radical of low molecular weight.

It has been found that valuable water-insoluble monoazo-dyestuffs of the general formula

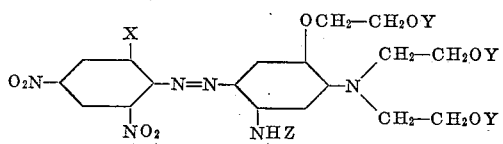

in which X represents a hydrogen, chlorine or bromine atom, Y represents a hydrogen atom or an acyl radical of low molecular weight, and Z represents an acyl radical of low molecular weight, can be prepared by diazotizing amines of the general formula

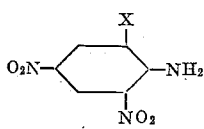

in which X has the meaning indicated above, and coupling them in the acid range with coupling components of the general formula

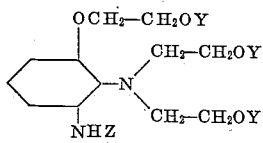

in which Y and Z have the meanings indicated above.

Suitable diazo components are the 2,4-dinitraniline and derivatives thereof substituted in 6-position by chlorine or bromine. As coupling components there may be used 2-dihydroxy-ethylamino-4-acetamino-β-hydroxy-phenetole and acylation products thereof.

The novel products dye as dispersion dyestuff semi- or fully synthetic fibers, such as acetate silk or polyethylene terephthalate violet to blue shades and in admixture with other dyestuffs are suitable for the production of black shades. The dyeings possess a good fastness to light and an excellent fastness to thermofixation.

The following examples serve to illustrate the invention, but they are not intended to limit it thereto.

Example 1

30 grams (1/10 mol) of 2-dihydroxy-ethylamino-4-acetamino-β-hydroxy-phenetole (obtained by reacting 1 mol of 2-amino-4-nitro-β-hydroxy-phenetole with 2 mols of ethylene oxide, reducing the nitro group and acetylating it with 1 mol of acetic anhydride) are dissolved in 100 grams of dioxane, and after the addition of 100 grams of acetic anhydride and 5 grams of pyridine the solution obtained is boiled under reflux for 30 minutes. After cooling the reaction mixture is poured on 500 grams of ice. Into this mixture is run, while vigorously stirring, the solution of 18.3 grams (1/10 mol) of diazotized 2,4-dinitraniline in 200 milliliters of glacial acetic acid. The pH-value is then adjusted to 3 by adding sodium acetate solution, and subsequently the whole is diluted with water to a volume of 3000 milliliters. The coupling product, which precipitated in the form of black-blue crystals, is filtered off after 2 hours, washed thoroughly with water and finally dried. 50 grams of a dyestuff of the formula

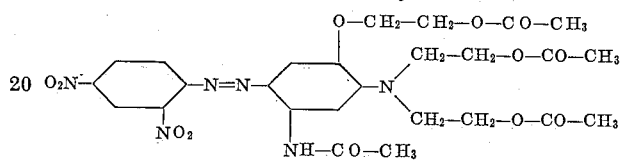

are obtained which dyes polyethylene terephthalate fibers violet-blue shades. The dyeings possess a good fastness to light and an excellent fastness to sublimation.

Example 2

The diazo compound prepared in usual manner from 26.2 grams (1/10 mol) of 2,4-dinitro-6-bromaniline dissolved in 250 grams of glacial acetic acid is run after the addition of ice into a solution prepared as described in Example 1 from 1/10 mol of 2-diacetohydroxy-ethyl-amino-4-acetamino - β - acetohydroxy-phenetole in 100 grams of dioxane. The coupling product is isolated as described in Example 1. The dyestuff obtained of the formula

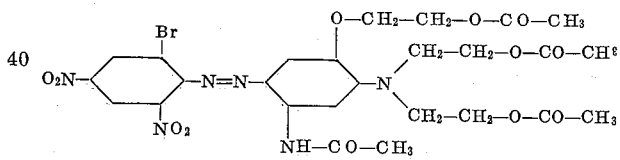

dyes polyethylene terephthalate fabric deep blue shades. The dyeings posses a very good fastness to light and an excellent fastness to sublimation.

A dyestuff of similar dyeing properties is obtained, when using instead of 26.2 grams of 2,4-dinitro-6-bromaniline 21.7 grams of 2,4-dinitro-6-chloraniline.

Example 3

A diazo solution prepared in usual manner from 21.7 grams (1/10 mole) of 2,4-dinitro-6-chloraniline is run into a solution of 30 grams (1/10 mol) of 2-dihydroxy-ethyl-amino-4-acetamino-β-hydroxy-phenetole in 100 grams of glacial acetic acid. The volume is then made up to 3 liters by diluting with water and the pH-value is adjusted to 3 by adding an acetate solution. The precipitated dyestuff is filtered off, washed and dried. 50 grams of a dyestuff are obtained which in an aqueous dispersion dyes polyethylene terephthalate fabric blue shades. The dyeings possess a good fastness to light and an excellent fastness to thermofixation.

When replacing for the preparation of the diazo compound the 21.7 grams of 2,4-dinitro-6-chloraniline by 26.2 grams of 2,4-dinitro-6-bromaniline and proceeding as described above, a dyestuff of similar shade is obtained which also possesses excellent fastness properties.

Example 4

30 grams (1/10 mol) of 2-dihydroxy-ethylamino-4-acetamino-β-hydroxy-phenetole are dissolved in 100 grams of dioxane. The solution obtained is boiled under reflux for 30 minutes after the addition of 20.4 grams (2/10 mol) of acetic anhydride. After cooling, the reaction mixture is poured on 500 grams of ice. The diazo compound prepared in usual manner from 26.2 grams (1/10 mol) of 2,4-dinitro-6-bromaniline is run, while vigorously stirring, into the thus obtained solution of the diaceto-hydroxy compound of 2-dihydroxy-ethylamino-4-acetamino-β-hydroxy-phenetole. The pH-value is then adjusted to 3 by adding an acetate solution and the whole is worked up as described in Example 1. The dyestuff obtained dyes polyethylene terephthalate blue shades. The dyeings possess a good fastness to light and an excelent fastness to sublimation.

A dyestuff of similar dyeing properties and similar shade is obtained, when using instead of the diazo compound prepared from 26.2 grams of dinitro-6-bromaniline the diazo solution prepared from 21.7 grams (1/10 mol) of 2,4-dinitro-6-chloraniline.

*Example 5*

30 grams (1/10 mol) of 2-dihydroxy-ethylamino-4-acetamino-β-hydroxy-phenetole dissolved in 100 grams of dioxane are acetylated as described in Example 4 with 10.2 grams (1/10 mol) of acetic anhydride and the reaction mixture is poured on ice. The diazo compound of 21.7 grams of 2,4-dinitro-6-chloraniline disolved in 250 milliliters of glacial acetic acid is then run into the mixture, subsequently the whole is diluted with water to a volume of 3 liters and the pH-value is adjusted to 3 by adding sodium acetate solution. The precipitated dyestuff is worked up as described in Example 1. It dyes polyethylene terephthalate fibers blue shades. The dyeings possess a good fastness to light and excelent thermal fastness properties.

A dyestuff of almost analogous fastness properties and very similar shade is obtained when using the diazo compound prepared from 26.2 grams (1/10 mol) of 2,4-dinitro-6-bromaniline instead of the diazo compound prepared from 2,4-dinitro-6-chloroaniline.

*Example 6*

30 grams (1/10 mol) of 2-dihydroxy-ethylamino-4-acetamino-β-hydroxy-phenetole are reacted as described in Example 4 with 20.4 grams (2/10 mol) of acetic anhydride. A diazo compound prepared in usual manner from 18.3 grams (1/10 mol) of 2,4-dinitraniline dissolved in 200 grams of glacial acetic acid are added to the reaction mixture to which ice had been added. The dyestuff which precipitated after the addition of acetate solution and water is isolated in the above-described manner. It dyes polyethylene terephthalate in an aqueous dispersion violet shades. The dyeings possess a good fastness to light and excellent thermal fastness properties.

*Example 7*

A diazo solution prepared in usual manner from 18.3 grams (1/10 mol) of 2,4-dinitraniline in 200 milliliters of glacial acetic acid are added to a solution of the reaction product described in Example 5 and obtained from 30 grams (1/10 mol) of 2-dihydroxy-ethylamino-4-acetamino-β-hydroxy-phenetole and 10.2 grams (1/10 mol) of acetic anhydride to which ice had been added. The whole is worked up as described in Example 5. The dyestuff obtained dyes polyethylene terephthalate bluish violet shades. The dyeings possess a good fastness to light and an excellent fastnes to thermofixation.

We claim:
1. The water-insoluble monoazo-dyestuffs having the formula

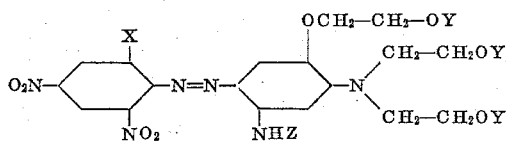

in which X represents a member of the group consisting of hydrogen, chlorine and bromine, Y represents a member of the group consisting of hydrogen and lower alkanoyl, and Z represents a lower alkanoyl group.

2. A water-insoluble dyestuff of the formula

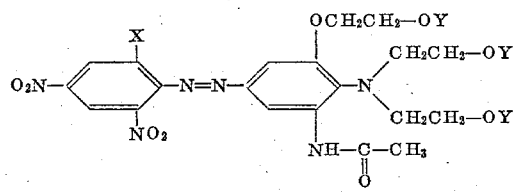

wherein X is a member selected from the group consisting of hydrogen, chlorine, and bromine and Y is a member selected from the group consisting of hydrogen and acetyl.

3. The water-insoluble monazo-dyestuff having the formula

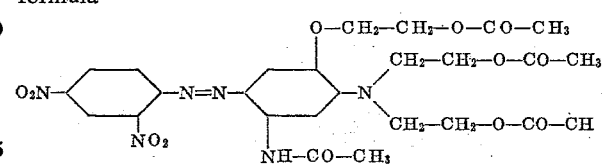

4. The water-insoluble monoazo-dyestuff having the formula

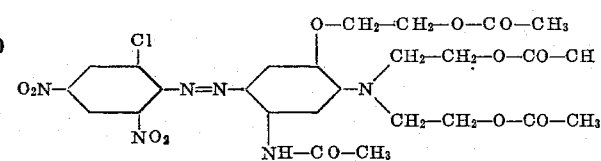

5. The water-insoluble monoazo-dyestuff having the formula

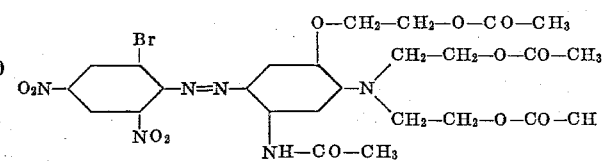

References Cited by the Examiner

UNITED STATES PATENTS 2,083,308   6/1937   Senn _____ 260—207
2,257,788   10/1941  Daudt et al. _____ 260—207

FOREIGN PATENTS 343,560   2/1960   Switzerland.

CHARLES B. PARKER, *Primary Examiner.*

IRVING MARCUS, *Examiner.*

REYNOLD J. FINNEGAN, DONALD PAPUGA,
*Assistant Examiners.*